United States Patent Office 2,754,461
Patented July 10, 1956

2,754,461

LIQUID RESISTANCES AND TO ELECTRIC MOTOR CONTROL EQUIPMENT, INCLUDING SUCH RESISTANCES

Erich Siegfried Friedlander, Sutton Coldfield, England, assignor to The General Electric Company Limited, London, England, a British company Application November 12, 1952, Serial No. 319,836

Claims priority, application Great Britain November 16, 1951

13 Claims. (Cl. 318—240)

The present invention relates to liquid resistances and also to electric motor equipment including such resistances.

One difficulty which is experienced with liquid resistances is that the resistance of the path between the electrodes of the resistance varies not only with the separation between the electrodes but is also dependent upon the concentration and also upon the temperature of the liquid. Variations in the resistivity of the liquid due to these causes may be troublesome, especially in arrangements in which it is desired to provide control means for adjusting the separation of the electrodes of the liquid resistance so as to obtain predetermined magnitudes of the resistance. It is an object of this invention to provide an arrangement in which compensation may be provided for variations in the specific resistivity of the liquid.

According to one aspect of the present invention, in an arrangement comprising a liquid resistance and means for altering the effective separation or area of the electrodes of the resistance, the means for varying the separation or area of the electrodes is arranged to be responsive not only to a control signal but also to the specific resistance of the liquid in the liquid resistance.

According to another aspect of the present invention in an alternating current electric motor equipment comprising a wound rotor induction motor and a liquid resistance for controlling the resistance of the rotor circuit, the effective separation or area of the electrodes of the liquid resistance is arranged to be controlled by means responsive to a control signal or control signals and also to the specific resistance of the liquid in the liquid resistance.

According to a further aspect of the present invention an alternating current electric motor equipment comprising a wound rotor polyphase induction motor, a liquid resistance for controlling the resistance of the rotor circuit, switching means for connecting the stator windings of the motor to a polyphase alternating current supply for driving, or alternatively for connecting one or more phase windings of the stator winding to a direct current supply for dynamic braking, a controller for varying the direct current excitation of the stator during braking and means for varying the effective separation or area of the electrodes of the liquid resistance of the rotor circuit in response to adjustment of the controller, has means arranged to provide at least partial compensation for variation in the specific resistance of the liquid in the liquid resistance. Preferably the compensation for variation in the specific resistance of the liquid in the liquid resistance is obtained by metering the specific resistance and applying a controlling signal to the means for varying the effective separation or area of the electrodes dependent upon the setting of the controller and also dependent upon the specific resistance.

The specific resistance of the liquid in the liquid resistance can conveniently be determined by metering the resistance between auxiliary electrodes mounted at a predetermined spacing in the liquid of the liquid resistance. The path between the auxiliary electrodes may be included in an electrical control circuit for controlling the separation of the electrodes of the liquid resistance. For example the separation of the electrodes of the liquid resistance may be arranged to be controlled by a fluid actuated device such for instance as a piston movable in a cylinder, the admission of fluid to the cylinder being controlled by an electric solenoid having a control winding to which a controlling signal is applied, the electric current through this control winding or through another control winding of the solenoid being arranged to be dependent upon the resistance of the path between the auxiliary electrodes so as to provide at least partial compensation for variations in the specific resistance of the liquid in the liquid resistance. One arrangement by which such compensation may be obtained is by connecting the metering resistance between the auxiliary electrodes in parallel with the control winding of the electric solenoid, the resistance of the metering resistance being appreciably less than the resistance of the control winding. In this way the voltage across the operating winding can be made practically proportional to the controlled current multiplied by the specific resistance of the liquid of the liquid resistance.

A liquid resistance as above described can be used for example in an alternating current electric motor equipment in which the separation between the electrodes of the liquid resistance is arranged to be controlled in dependence upon a control signal dependent upon the speed of the induction motor. This control signal or a separate control signal may be arranged to be varied in dependence upon the specific resistance of the liquid in the liquid resistance, the specific resistance being metered by an arrangement as above described, the arrangement being such that the resistance presented by the liquid resistance is rendered substantially less dependent upon the specific resistance of the liquid of the liquid resistance than in an arrangement without such compensation.

Two arrangements in accordance with the present invention as applied to the control of alternating current electric motor equipment arranged to provide driving and braking will now be described by way of example with reference to the accompanying drawings. In the drawings.

Figure 1:
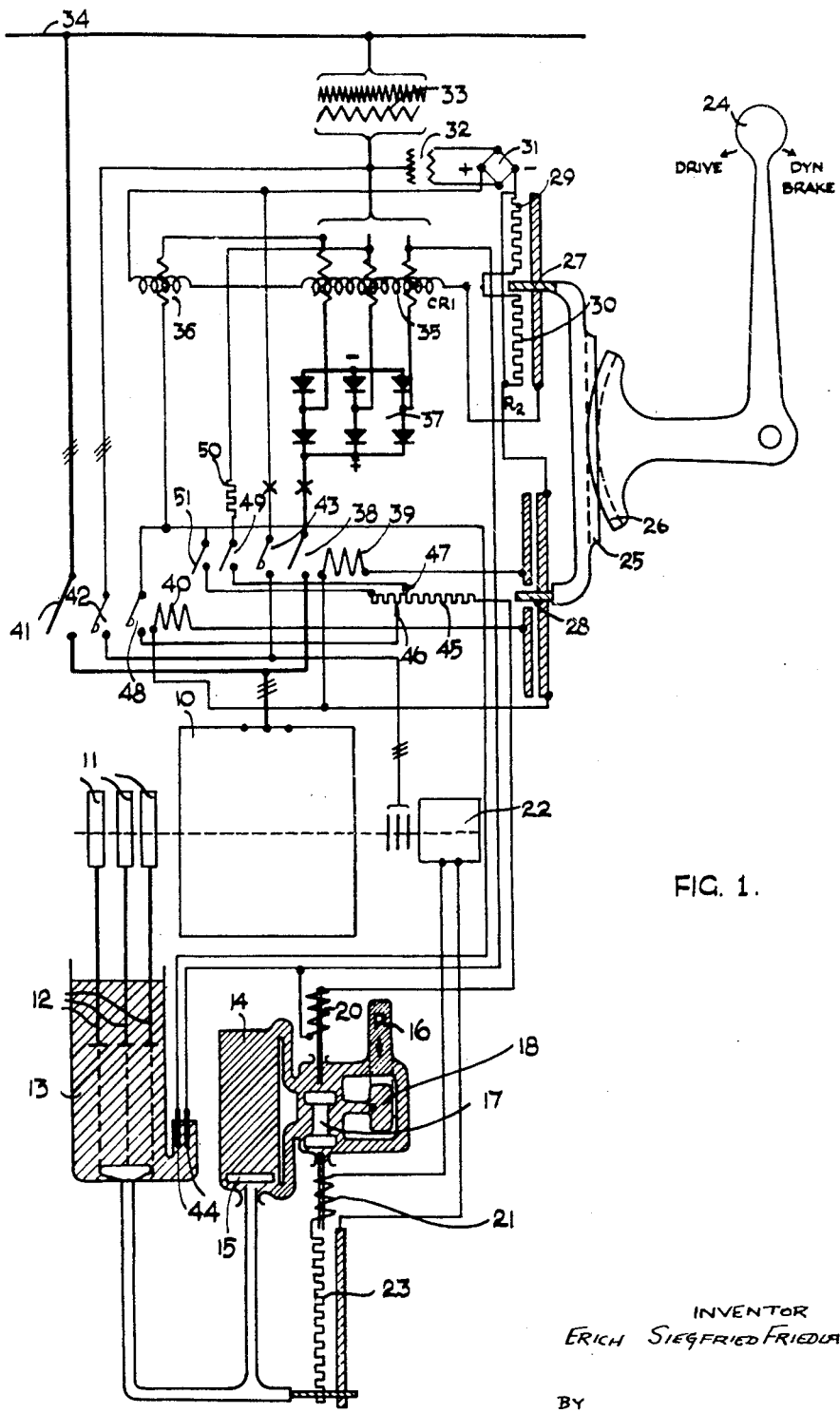
Figure 1 is a diagram showing the arrangement of a control system for an alternating current induction motor used in a mine winder providing torque control for driving and also for dynamic braking.

Referring to Figure 1 of the drawings, the apparatus comprises a wound rotor induction motor 10 having the rotor connections brought out to sliprings 11 which are connected to the three upper electrodes 12 of a liquid resistance 13. In order to simplify the drawings three-phase circuits are indicated by a single line with three oblique strokes. Direct current circuits where not shown in full are indicated by a single line with a cross. The area of the electrodes in the electrolyte is arranged to be adjustable by a servo system comprising a fluid operated motor 14 or Isenthal regulator having a double acting piston 15 movable in a cylinder, the separation of the electrodes 12 in the electrolyte being arranged to be dependent upon the position of the piston 15 in the cylinder. Admission of fluid under pressure from a supply 16 to one side or the other of the piston 15 is controlled by a valve 17 which when one side of the piston is connected to the supply is arranged to connect the other side of the piston to a sink 18. The valve 17 is electrically controlled by solenoid windings 20 and 21 respectively. The operating winding 21 of the valve 17 is fed with a current obtained from a control generator 22 mounted on the shaft of the induction motor 10, the current also being dependent upon the value of a series resistance 23 which depends upon the position of the piston 15 and consequently the separation of the electrodes 12 in the electrolyte. If desired, the control generator 22 may be arranged to generate two-phase or polyphase current, an appropriate number of operating windings such as 21 and resistances such as 23 being provided according to the number of phases of the control generator. The other control winding 20 of the valve 17 is arranged to be fed with current, the magnitude of which depends upon the setting of a control lever 24 which is coupled by a rack and pinion mechanism 25 and 26 to two movable contacts 27 and 28. The movable contact 27 is arranged to travel over two similar sections 29 and 30 of a resistance, the two sections 29 and 30 being connected in parallel and arranged to be supplied with direct current from a bridge-connected rectifier 31 fed from auxiliary transformers 32 and 33 from a three-phase alternating current supply 34. Direct current from the bridge-connected rectifier 31 is arranged to flow in a circuit comprising the control windings of two saturable reactor devices 35 and 36 and also through the portion of the resistance sections 29 or 30 between the slidable contact 27 and the outer ends of the sections. The saturable reactor device 35 has three-phase alternating current windings, the degree of saturation of the core and hence the reactance of the three-phase windings being controlled by the magnitude of the current in the control winding. The three-phase windings of the saturable reactor device 35 feed a double bridge-connected rectifier 37 from which direct current can be fed through a contactor 38 to two phases of the primary windings of the motor 10 when required for dynamic braking. The contactor 38 has an operating winding 39 which is arranged to be energised when the movable contact 28 controlled by the control lever 24 is displaced upwardly from a central position. When the control lever 24 is displaced in the opposite direction the movable contact 28 is arranged to effect the energisation of the operating winding 40 of a driving contactor 41 so that the primary windings of the motor 10 are connected to the three-phase alternating current supply 34. It will be appreciated that, in practice, the driving contactor 41 and the associated operating winding will be duplicated so as to allow change of the direction of rotation of the winder motor. Three-phase alternating current is fed from the auxiliary transformer 33 through an auxiliary contact 42 on the driving contactor to three-phase windings of the control generator 22 when the driving contactor is closed. When, however, the driving contactor is open and the dynamic braking contactor 38 is closed, the sliprings of the control generator 22 are supplied with direct current from the bridge-connected rectifier 31 through auxiliary contacts 43 of the dynamic braking contactor. The operating winding 20 of the valve 17 is fed with current having two components. One end of the operating winding 20 is connected to one of the three-phase supply lines from the auxiliary transformer 33 and is also connected through a metering section of the liquid resistance 13 between two fixed electrodes 44 and through the alternating current winding of the saturable reactor device 36 to another phase of the alternating current supply obtained from the auxiliary transformer 33. The other end of the operating winding 20 is connected to one end of a tapped resistance 45 having tappings 46 and 47. The tapping 46 is connected through an auxiliary contact 48 of the driving contactor 41, when the contactor is closed, to the alternating current winding of the saturable reactor device 36 and thence to a second phase of the three-phase supply obtained from the auxiliary transformer 33. When the driving contactor 41 is open and the braking contactor 38 is closed the tapping 47 on the resistance 45 is connected through auxiliary contacts 49 of the braking contactor 38 and through a resistance 50 to the third phase of the three-phase alternating current supply from the auxiliary transformer 33. When the braking contactor is closed, one end of the resistance 45 is connected through a further auxiliary contact 51 of the braking contactor to the end of the alternating current winding of the saturable reactor device 36 which is connected to the auxiliary contact 48 of the driving contactor.

It will be noted that the control signal applied to the second control winding 20 of the valve 17 is dependent not only upon the setting of the control lever 24 but is also dependent upon the resistance of the path between the two auxiliary electrodes 44 which are mounted in the same liquid as that forming the liquid resistance so that variations of the resistance between the auxiliary electrodes 44 is dependent upon the specific resistance of the liquid of the liquid resistance 13. During braking the simultaneous control of both the direct current excitation of the induction motor and of the second component of the control signal applied to the second operating winding 20 by the same control current depending on the position of the control lever 24 is made possible by the splitting of the control signal applied to the operating winding 20 into two components as above explained. This makes it possible to satisfy the conditions of optimum control set out in our earlier British patent specification No. 625,950 without necessitating the provision of a special tapped transformer in the circuit through which the control signal is passed through the operating winding 21 of the valve 17.

When the control handle 24 of the controller is in its central position the primary windings of the induction motor are not energised and the separation between the electrodes of the liquid resistance 13 is at maximum so that the liquid resistance has its maximum value. If the control handle 24 is displaced in the driving direction the driving contactor 41 and its associated auxiliary contacts are closed so that the induction motor 10 starts up with the maximum value of the liquid resistance 13 in series with the rotor or secondary windings. A signal dependent upon the speed of the induction motor derived from the control generator 22 is fed to the first operating winding 21 of the valve 17. The magnitude of the electrical signal applied to the control winding 20 of the valve 17 is dependent upon the setting of the control handle 24 of the controller so that the separation of the electrodes 12 of the liquid resistance 13 is a function both of the speed of the induction motor and of the setting of the control handle 24. During braking the connections between the primary windings of the motor 10 and the three-phase alternating current supply 34 are broken and direct current excitation obtained from the rectifier 37 which is fed through the alternating current windings of the saturable reactor device 35 is applied to two phases of the primary windings. The magnitude of this direct current excitation depends upon the setting of the control handle 24, being greatest when the handle is displaced into its extreme position in the braking direction. The setting of the handle 24 of the controller also varies the magnitude of the signal applied to the operating winding 20 of the valve 17, this signal having two components obtained from different phases of the alternating current supply from the auxiliary transformer 33. The component of this signal obtained through the auxiliary contacts 49 of the contactor is pre-set in magnitude while the other component is varied in accordance with the extent of the displacement of the control handle 24 of the controller from its mid-position and also in dependence upon the specific resistance of the liquid of the liquid resistance 13 as determined by the resistance of the path between the metering electrodes 44. As an alternative to inserting the metering resistance between the electrodes 44, the magnitude of the signal applied to the operating winding 21 of the valve 17 may be made to vary in dependence upon the value of a liquid resistance having the same electrolyte as the liquid resistance 13 or having separate electrolyte which is maintained at the same concentration and temperature as that in the main liquid resistance 13.

In the arrangement above described with reference to Figure 1 of the accompanying drawings, control is effected to maintain a predetermined relationship between torque and the position of the control handle 24. In the arrangement which will now be described by way of example, with reference to Figure 2 of the accompanying drawings, provision is made for control of the speed of the motor in dependence upon the setting of the control handle 24 but in this arrangement no provision is shown for permitting dynamic braking though it is to be understood that if desired provision may be made for dynamic braking by supplying direct current to two phases of the primary windings of the induction motor 10 generally as above described.

Figure 2:
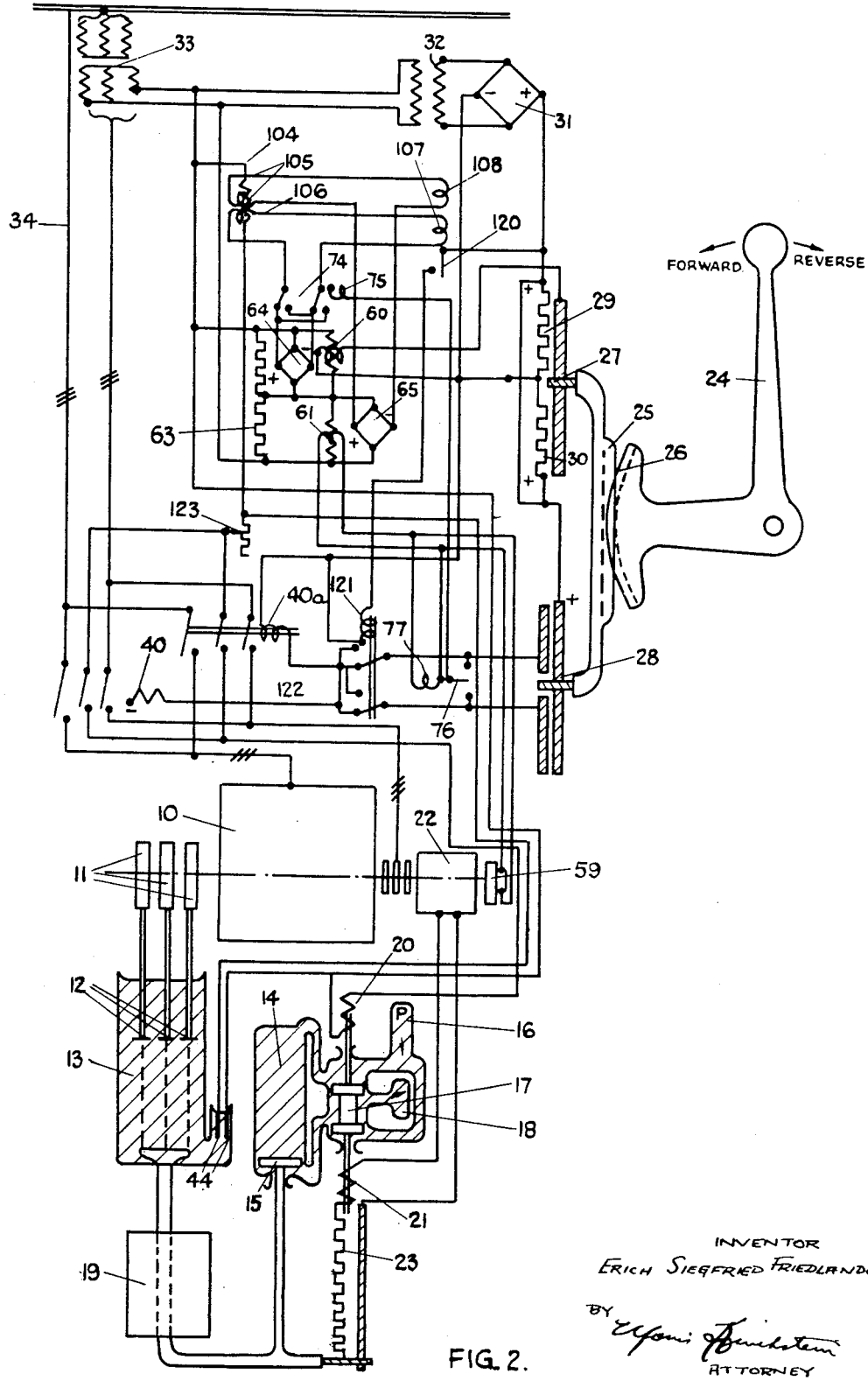
Figure 2 shows another arrangement for the control of an alternating current winder motor in which provision is made for speed and torque control during driving and also during braking by plugging.

Referring to Figure 2 of the drawings, the arrangement of the motor 10, liquid resistance 13, cylinder and piston 14 and 15 and control valve 17 and also of the control generator 22 and the mechanical arrangement of the control handle 24 are similar to those above described with reference to Figure 1 of the accompanying drawings. In the arrangement shown in Figure 2, however, a follower servo mechanism 19 is included in the connection between the piston 15 and the means for altering the separation of the electrodes 12 of the liquid resistance 13. Coupled to the shaft of the motor 10 is a tachometer generator 59 which is arranged to provide a direct current output for feeding into the control system.

The magnitude of the voltage obtained from the moving contact 27 which is movable along the resistances 29 and 30 which are supplied with direct current from the bridge-connected rectifier 31 is arranged to control the saturation of a magnetic amplifier device 60 having an alternating current winding connected in series with the alternating current winding of a second similar magnetic amplifier device 61. The alternating current windings of the magnetic amplifier devices 60 and 61 are supplied with single-phase alternating current obtained from the three-phase alternating current supply 34 through the auxiliary transformer 33. Each alternating current winding of the magnetic amplifier devices 60 and 61 is connected in parallel with one half of a centre tapped loading resistance 63. A bridge-connected rectifier 64 has its alternating current terminals connected across the alternating current winding of the magnetic amplifier device 60 while a similar bridge-connected rectifier 65 has its alternating current terminals connected across the alternating current winding of the magnetic amplifier device 61. The control winding of the magnetic amplifier device 61 is connected across the direct current output terminals of the tachometer generator 59. When the voltage obtained from the slider 27 is equal to the voltage obtained from the tachometer generator 59 the two magnetic amplifier devices 60 and 61 are saturated to the same extent so that the D. C. output voltages from their corresponding bridge-connected rectifiers 64 and 65 are equal. Also connected across the direct current output from the tachometer generator 59 is the operating winding 77 of a polarised relay operating change-over contacts 76, the polarised relay being arranged to respond to the direction of rotation of the winder motor 10. The change-over contacts 76 in association with the movable contact 27 and the contacts associated with the movable contact 28 control the energisation of the operating winding 75 of the plugging contactor having double-pole change-over contacts 74. The output from the bridge-connected rectifier 64 is applied through the double-pole change-over contacts 74, which operate as a reversing switch, to one control winding 106 of a saturable reactor 104 which has two control windings 105 and 106 respectively. The control winding 106 is connected in series with one control winding 107 of a polarised relay having also a second control winding 108. The other control winding 105 of the saturable reactor 104 is fed from the direct current output terminals of the bridge-connected rectifier 65 and is connected in series with the second control winding 108 of the polarised relay. The polarised relay having the operating windings 107 and 108 has a single make and break contact 120 which when closed excite the operating winding 121 of a contactor having double-pole change-over contacts 122 which control the energisation of the operating winding 40 or 40a of forward and reverse contactors controlling the supply of alternating current to the primary windings of the induction motor 10. The alternating current winding of the saturable reactor 104 controls the magnitude of an alternating current fed to the control winding 20 of the valve 17, this current passing through two paths one of which goes through the metering resistance between the electrodes 44 in the electrolyte of the liquid resistance 13 while the other goes through an adjustable resistance 123 and auxiliary contacts of the forward and reverse contactors.

With this arrangement shown in Figure 2 of the accompanying drawings control of the speed of the motor 10 is effected by alteration of the value of the resistance included in the rotor circuit by operation of the valve 17 when the voltage obtained from the tachometer generator 59 and applied to the control winding of the magnetic amplifier device 61 is unequal to the voltage obtained from the movable contact 28 representing the speed set by the control lever 24 and which is applied to the control winding of the magnetic amplifier device 60. These voltages are also applied to the operating windings 107 and 108 of the polarised relay having the contacts 120. The arrangement of the control system is such that when the motor 10 is rotating, for example in the forward direction, at a speed corresponding to the speed set by the control lever 24, the forward contactor is closed and a predetermined magnitude of the liquid resistance 13 is included in the rotor circuit of the motor. If the speed of rotation of the motor is less than the speed set by the control lever 24 the resistance inserted in the rotor circuit is reduced while if the speed of rotation of the motor 10 substantially exceeds the speed set by the control lever 24 braking by plugging is brought into operation by the opening of the forward contactor and the closing of the reverse contactor, the magnitude of the liquid resistance included in the rotor circuit of the motor 10 being altered to a value appropriate to the amount of braking required. When the motor 10 is rotating in the reverse direction the reverse contactor will normally be closed, but if the speed of rotation substantially exceeds the speed set by the control lever 24 the reverse contactor will be opened and the forward contactor closed to provide braking by plugging.

In both the arrangements above described the metering section of the liquid resistance between the electrodes 44 is arranged to provide compensation for variations in the specific resistance of the electrolyte of the liquid resistance 13 such as may occur during operation as a result for example of variations in the concentration of the electrolyte or variations of the temperature thereof. While two applications of liquid resistances in accordance with the present invention have been described as applied to control systems for electric motors in which the resistance is included in the rotor circuit of an induction motor, it will be appreciated that the principles of the present invention are more widely applicable and may be used when it is desired to provide compensation for variations in the specific resistance of the electrolyte of a liquid resistance used for a wide variety of other purposes for which liquid resistance may be used.

I claim:

1. An arrangement comprising a liquid resistance and means for altering the effective separation or area of the electrodes of the resistance, wherein the means for varying the separation or area of the electrodes is arranged to be responsive not only to a control signal but also to 1. the specific resistance of the liquid in the liquid resistance, and wherein auxiliary electrodes are provided in the electrolyte of the liquid resistance to provide a metering section of the liquid resistance arranged to influence the means for varying the separation or area of the electrodes.

2. An arrangement comprising a liquid resistance having electrodes, means for moving said electrodes to vary the magnitude of said resistance, auxiliary electrodes in electrolyte which electrolyte is maintained at the same temperature and concentration as that of the liquid resistance, but electrically isolated therefrom, said means for moving the electrodes being responsive not only to a control signal but also to the magnitude of the resistance between the auxiliary electrodes.

3. An alternating current electric motor equipment comprising a wound rotor induction motor, a liquid resistance having movable electrodes connected in the rotor circuit of the induction motor, auxiliary electrodes in the electrolyte of the liquid resistance, and means for moving said electrodes to vary the magnitude of the resistance in the rotor circuit in dependence upon a control signal and also in dependence upon the resistance of the electrolyte between the auxiliary electrodes.

4. An alternating current electric motor equipment comprising a wound rotor induction motor, a liquid resistance having movable electrodes connected in the rotor circuit of the induction motor, auxiliary electrodes in electrolyte maintained at the same temperature and concentration as the electrolyte of the liquid resistance, control means for setting a desired torque of the induction motor, and means for moving said electrodes to vary the magnitude of the liquid resistance in the rotor circuit in dependence upon the desired torque and also upon the resistance of the electrolyte between the auxiliary electrodes.

5. An alternating current electric motor equipment comprising a wound rotor induction motor, a liquid resistance having movable electrodes connected in the rotor circuit of the induction motor, auxiliary electrodes in electrolyte maintained at the same temperature and concentration as the electrolyte of the liquid resistance, control means for setting a desired speed of the induction motor, means responsive to the actual speed of the motor, comparison means for comparing the desired speed and the actual speed of the induction motor, and means for moving said electrodes to vary the magnitude of the liquid resistance in the rotor circuit in dependence upon the comparison of the desired and actual speeds and also upon the resistance of the electrolyte between the auxiliary electrodes.

6. An alternating current electric motor equipment comprising a wound rotor polyphase induction motor, a liquid resistance having movable electrodes connected in the rotor circuit of the induction motor, auxiliary electrodes in electrolyte maintained at the same temperature and concentration as the electrolyte of the liquid resistance, switching means for connecting stator windings of the induction motor selectively to a polyphase alternating current supply for driving and to a direct current supply for dynamic braking, a controller for varying the direct current excitation of the stator during braking, control means for setting a desired torque of the induction motor, and means for moving said electrodes to vary the magnitude of the liquid resistance in the rotor circuit in dependence upon the desired torque and also upon the resistance of the electrolyte between the auxiliary electrodes.

7. An alternating current electric motor equipment comprising a wound rotor polyphase induction motor, a liquid resistance having movable electrodes connected in the rotor circuit of the induction motor, auxiliary electrodes in electrolyte maintained at the same temperature and concentration as the electrolyte of the liquid resistance, switching means for connecting stator windings of the induction motor selectively to a polyphase alternating current supply for driving and to a direct current supply for dynamic braking, a controller for varying the direct current excitation of the stator during braking, control means for setting a desired speed of the induction motor, means responsive to the actual speed of the motor, comparison means for comparing the desired speed and the actual speed of the induction motor, and means for moving said electrodes to vary the magnitude of the liquid resistance in the rotor circuit in dependence upon the comparison of the desired and actual speeds and also upon the resistance of the electrolyte between the auxiliary electrodes.

8. An arrangement comprising a liquid resistance having main electrodes, means for altering the effective separation or area of the main electrodes of the liquid resistance, auxiliary electrodes in the electrolyte of the liquid resistance to provide a metering section of the liquid resistance, and means for varying the separation or area of the main electrodes in the electrolyte of the liquid resistance in dependence upon a control signal and also upon the resistance of said metering section.

9. In an alternating current electric motor equipment including a wound rotor induction motor: a liquid resistance having moveable electrodes arranged to be connected in the rotor circuit of the induction motor, auxiliary electrode in the electrolyte of the liquid resistance, and means for moving said electrodes to vary the magnitude of the resistance in the rotor circuit in dependence upon a control signal and also in dependence upon the resistance of the electrolyte between the auxiliary electrodes.

10. In an alternating current electric motor equipment including a wound rotor induction motor: a liquid resistance having moveable electrodes arranged to be connected in the rotor circuit of the induction motor, auxiliary electrodes in electrolyte maintained at the same temperature and concentration as the electrolyte of the liquid resistance, control means for setting a desired torque of the induction motor, and means for moving said electrodes to vary the magnitude of the liquid resistance in the rotor circuit in dependence upon the desired torque and also upon the resistance of the electrolyte between the auxiliary electrodes.

11. In an alternating current electric motor equipment including a wound rotor induction motor: auxiliary electrodes in electrolyte maintained at the same temperature and concentration as the electrolyte of the liquid resistance, control means for setting a desired speed of the induction motor, means responsive to the actual speed of the motor, comparison means for comparing the desired speed and the actual speed of the induction motor, and means for moving said electrodes to vary the magnitude of the liquid resistance in the rotor circuit in dependence upon the comparison of the desired and actual speeds and also upon the resistance of the electrolyte between the auxiliary electrodes.

12. In an alternating current electric motor equipment including a wound rotor induction motor: auxiliary electrodes in electrolyte maintained at the same temperature and concentration as the electrolyte of the liquid resistance, switching means for connecting stator windings of the induction motor selectively to a polyphase alternating current supply for driving and to a direct current supply for dynamic braking, a controller for varying the direct current excitation of the stator during braking, control means for setting a desired torque of the induction motor, and means for moving said electrodes to vary the magnitude of the liquid resistance in the rotor circuit in dependence upon the desired torque and also upon the resistance of the electrolyte between the auxiliary electrodes.

13. In an alternating current electric motor equipment including a wound rotor polyphase induction motor: a liquid resistance having moveable electrodes arranged to be connected in the rotor circuit of the polyphase induction motor, auxiliary electrodes in electrolyte maintained at the same temperature and concentration as the electrolyte of the liquid resistance, switching means for connecting stator windings of the induction motor selectively to a polyphase alternating current supply for driving and to a direct current supply for dynamic braking, a controller for varying the direct current excitation of the stator during braking, control means for setting a desired speed of the induction motor, means responsive to the actual speed of the motor, comparison means for comparing the desired speed and the actual speed of the induction motor, and means for moving said electrodes to vary the magnitude of the liquid resistance in the rotor circuit in dependence upon the comparison of the desired and actual speeds and also upon the resistance of the electrolyte between the auxiliary electrodes.

References Cited in the file of this patent

UNITED STATES PATENTS

| | | |
|---|---|---|
| 1,231,666 | Stuart | July 3, 1917 |
| 1,241,567 | Simmon et al. | Oct. 2, 1917 |
| 2,367,025 | Huston | Jan. 9, 1945 |
| 2,503,718 | Friedlander | Apr. 11, 1950 |

FOREIGN PATENTS

| | | |
|---|---|---|
| 625,951 | Great Britain | July 6, 1949 |